J. V. MONTRIEF.
BRICK KILN.
APPLICATION FILED NOV. 25, 1913.
1,146,197.
Patented July 13, 1915.
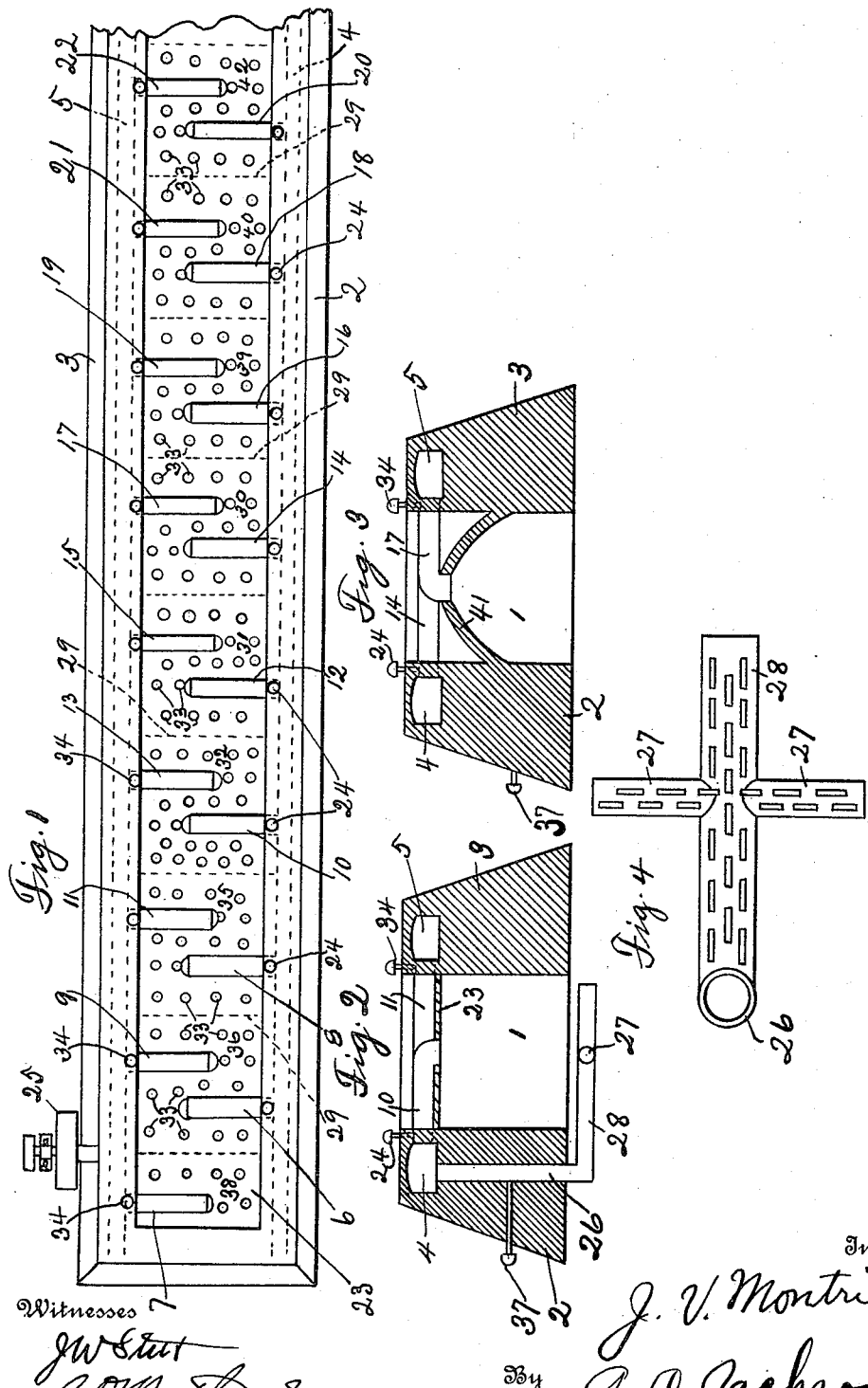

UNITED STATES PATENT OFFICE.

JAMES V. MONTRIEF, OF BRIDGEPORT, TEXAS.

BRICK-KILN.

1,146,197.　　　　　Specification of Letters Patent.　　Patented July 13, 1915.

Application filed November 25, 1913. Serial No. 802,920.

*To all whom it may concern:*

Be it known that I, JAMES V. MONTRIEF, a citizen of the United States, residing at Bridgeport, in the county of Wise and State of Texas, have invented certain new and useful Improvements in Brick-Kilns, of which the following is a specification.

This invention relates to certain improvements in that class of kilns for brick and other clay ware, in which the goods fired or baked are placed in a structure or gallery, which may be described as long and narrow and divided by transverse partitions into compartments, generally called chambers. These chambers are filled, fired, cooled and emptied progressively, and when the structure is built endless, in circular, rectangular or elliptical form is called a continuous kiln, and when built with ends is called a semi-continuous kiln. It is generally known that these kilns in which the zone of high heat progresses horizontally and in which the air for supporting combustion reaches the fuel in a highly heated state from having passed through several chambers of cooling goods, and in which the combustion gases leaving the zone of high heat travel horizontally through several chambers of unbaked goods preparing them for high heat, are economical in the amount of fuel consumed. The principal objection to such kilns is that the heated air and combustion gases, in their passage through unbaked goods, take up a great deal of moisture, and, before reaching the exit from the kiln, pass through other ware, which is yet of so low temperature as to cause this moisture, in many cases, with the addition of sulfurous and other objectionable gases from the fuel used, to be redeposited on the cooler ware, causing an unsightly scum to remain on the ware after it is finished, injuring its market value; and sometimes the amount of moisture deposited on the cool ware is so great as to soften the ware to such an extent that the ware nearest to the floor will not sustain the weight of goods piled above it, and it is thereby ruined while in the soft condition.

The object of my invention is to overcome the objection to such kilns without materially lessening their fuel economy.

This invention can be applied to old kilns or built into new kilns of the class mentioned.

Other objects and advantages will be fully explained in the following description and the invention will be more particularly pointed out in the claims.

Reference is had to the accompanying drawings which form part of this application.

Figure 1 is a top plan view of a kiln, illustrating my invention, only enough chambers being shown to illustrate the invention. Fig. 2 is a vertical section of a kiln, showing the manner of circulating heated air. Fig. 3 is a vertical section of a kiln illustrating a variation in the construction of the kiln, the kiln here shown having a masonry arch which makes what is called a tunnel kiln. Fig. 4 is a detail view of a heat circulating flue or duct for circulating heat in a chamber which is to be water smoked.

Similar characters of reference are used to indicate the same parts throughout the several views.

A kiln is shown provided with a gallery 1 and side-walls 2 and 3. Ducts or tunnels or flues 4 and 5 are built in the walls 2 and 3 near their tops and extend throughout the length of these walls. Communication is formed between the ducts 4 and 5 and the gallery 1 by numerous ducts or flues on the sides, open toward the firing gallery. These ducts may be formed by masonry tunnels or tubes 6 to 22 inclusive, which extend from the walls 2 and 3 to points over the top of the gallery 1 and then are turned down through openings made in the permanent arch 41 or through the temporary roof 23 of an open top kiln. It will be understood that such ducts or flues may be used with continuous or semi-continuous kilns, or with continuous or semi-continuous tunnel kilns, whether the kilns are open-top or covered with arched masonry. These ducts 6 to 22 may also be formed as lateral projections from the walls 2 and 3, and formed of masonry. Each flue is provided with a valve 24 which controls communication from the gallery 1 to the duct 4 and valves 34 which control communication from the gallery to the flue or tunnel 5 whenever desirable or necessary. The duct or tunnel 4 is provided for the proper circulation of heated air. The duct 5 is the water-smoke duct provided for carrying away the mixture of warm air, aqueous vapor and the gases of the volatile matter contained in the clay, which comes off while the baking brick or other clay ware is undergoing its first few hundred degrees of rise of temperature at the beginning of the firing process. The water-smoke duct 5 is connected at some convenient point to a wheel fan 25, for the purpose of producing induced currents of air through the duct or tunnel 5 and its lateral ducts, which extend out over and down within the gallery 1. The wheel fan illustrates one way of causing induced drafts and it is not an intention to limit this invention to such means, as other means can be utilized for causing the induced current. During operation, the fan 25 runs continuously and the current will be controlled by the valve 34 in a manner hereinafter set forth. The duct 5 has no opening or means of circulation except the lateral ducts 7, 9, 11, 13, 15, 17, 21, and 22 and the communication with the fan 25. The duct 4 is for the purpose of distributing the heated air from and to the gallery 1 by means of the lateral ducts 6, 8, 10, 12, 14, 16, 18, and 20, and by the downcast tubes or ducts 26, which may correspond in number and location along the duct 4 as the lateral or transverse ducts just mentioned. But it may be found to be more practicable to use more transverse ducts than are shown in the drawings, and one or more such ducts may be used with each chamber without departing from this invention. Each duct 26 is provided with a cut-off valve 37 for cutting off and opening communication with the gallery 1 whenever necessary. The ducts 26 have members 28 extending transversely under the firing gallery 1 and the members 28 are perforated by slots on the upper sides, as shown in Fig. 4, to allow heated air, being caused by induced currents, to pass upwardly in to the gallery 1. For further distribution of the heated air, the tubes 28 are provided with lateral members 27, which are also perforated on the upper sides. The gallery 1 is divided into numerous chambers by transverse vertical partitions 29. Each chamber is carefully sealed up tight with partitions between it and the preceding and succeeding chambers. The operation of firing the gallery is progressive, and the object of sealing the chambers tight is to confine the induced draft to the particular chamber which is being heated. The unbaked ware will be heated in advance of the firing and in advance of the burning partitions. These partitions may be made of paper and are not permanent partitions at all. The kiln is provided with one or more water-smoke connections for each chamber in the firing gallery and also with one or more hot-air connections on the other side of the gallery, with the downcast drafts and distribution flues or tubes.

All the valves 24 will stand closed, except those which are being used for transferring heated air. A hot-air distribution tube 26 and its valve 37 will be open, while the water-smoke valve 34 in the same chamber will be open to the duct 5. All the hot air distribution valves will stand closed except those through which heated air is being taken. The valves must be so regulated to accomplish the preliminary heating and water-smoking of the cool unbaked ware without using combustion gases for that purpose. Suppose the kiln to be in full operation with a number of cooling chambers behind the zone of full fire and a number of chambers filled with unbaked ware ahead of full fire. Suppose the chamber 40 is in full fire. The chamber to be water-smoked should be about six chambers ahead of the one which is under full fire, as chamber 36. The flue 9 will be open to the duct 5 by means of a valve 34 and a flue 26 will be opened by its valve 37 to admit heated air under the bottom of the chamber 36 while a valve 24 will be open for taking clean heated air from two or three chambers back of the chamber 40. Communication will be opened from the gallery 1 by means of a valve 24, opening into duct 4 for taking heated air from the cooling chamber and transferring it along the flue or duct 4 until it reaches the downcast flue 26 which leads under the bottom of chamber 36. The warm air or aqueous vapor, which is water-smoke, will pass up through the chamber 36 and thence through the flue 9 and duct 5 by reason of the induced draft through this flue and this duct. The advantage of water-smoking upwardly is that the ware at the bottom is dried first, thereby making it capable of sustaining the weight of the ware above. The means herein described are intended to accomplish the water-smoking rapidly and thoroughly and with certainty and without permitting combustion gases coming in contact with the cool unbaked ware. It is necessary to the successful water-smoking that there is a forced draft moving upwardly through the ware. The operation in all the chambers 42, 40, 39, 30, 31, 32, 35, 36, and 38 will be the same, that is, clean heated air will be taken from a chamber two or three chambers back of the chamber which is under full fire and transferred by means of the flue or tunnel 4 and distributed under the bottom of a chamber about six chambers ahead of the chamber which is under full fire. As soon as one chamber is disposed of, the next chamber in order will be treated in the same manner. The paper partitions will be consumed in the process of firing as usual.

No attempt is made to describe or illustrate the flues and other mechanism used in firing the chambers as such mechanism forms no part of my invention. In Fig. 1 are shown a number of windows or feed holes 33 in the roof of the firing gallery which may be used in a firing process when the kiln is fired in such manner. The flues which lead from the gallery 1 to the ducts 4 and 5 may be made of any suitable material and may be of any suitable size, and more or less of such flues can be used as may be desirable or practicable.

What I claim, is,—

1. A kiln having two parallel walls inclosing a firing gallery, each wall having a longitudinal tunnel therein near the top part, transverse flues connected with said tunnels and projecting over and down into the firing gallery, each flue being provided with a valve, one of said tunnels being a water-smoke tunnel and the other tunnel being a heated air tunnel, means for creating induced currents in the water-smoke tunnel, downcast flues connected with said heated air tunnel and extending under the said firing gallery and having perforations in the upper side for discharging heated air under the firing gallery, and a valve for each downcast flue.

2. In a kiln provided with two walls inclosing a firing gallery, a series of partitions dividing said gallery into sealed tight chambers, means for water-smoking unbaked ware in said chambers consisting of one of said walls having a water-smoke tunnel and the other wall having a heated air tunnel, means for opening and closing communication from the upper parts of said chambers to said water smoke tunnel, means for opening and closing communication from the upper parts of said chambers individually to said heated air tunnel, means for distributing heated air from said heated air tunnel under the bottom of each of said chambers individually, and means for causing induced currents upwardly through each chamber.

In testimony whereof, I set my hand in the presence of two witnesses, this 17th day of November, 1913.

JAMES V. MONTRIEF.

Witnesses:
A. L. JACKSON,
J. W. STITT.

Copies of this patent may be obtained for five cents each, by addressing the "Commissioner of Patents, Washington, D. C."